United States Patent [19]

Nishimae et al.

[11] Patent Number: 5,392,309
[45] Date of Patent: Feb. 21, 1995

[54] LASER APPARATUS INCLUDES AN UNSTABLE RESONATOR AND A SHADING MEANS

[75] Inventors: Junichi Nishimae; Kenji Yoshizawa, both of Hyogo; Kenji Kumamoto, Aichi, all of Japan

[73] Assignee: Mitsubishi Denki Kabushiki Kaisha, Tokyo, Japan

[21] Appl. No.: 120,754

[22] Filed: Sep. 15, 1993

[30] Foreign Application Priority Data

Oct. 21, 1992 [JP] Japan ................... 4-305896

[51] Int. Cl.⁶ ......................................... H01S 3/08
[52] U.S. Cl. ................................... 372/95; 372/9; 372/98; 372/99; 372/103
[58] Field of Search .............. 372/95, 99, 101, 103, 372/108, 9, 98; 359/559

[56] References Cited

U.S. PATENT DOCUMENTS

| | | | |
|---|---|---|---|
| 3,937,079 | 2/1976 | Chodzko | 372/95 X |
| 3,980,397 | 9/1976 | Judd et al. | 372/103 |
| 4,719,639 | 1/1988 | Tulip | 372/95 X |
| 4,903,271 | 2/1990 | Yasui et al. | 372/95 X |
| 4,942,588 | 7/1990 | Yasui et al. | 372/95 X |
| 5,048,048 | 9/1991 | Nishimae et al. | 372/95 |
| 5,065,407 | 11/1991 | Pax | 372/103 |
| 5,125,001 | 6/1992 | Yagi et al. | 372/95 X |

FOREIGN PATENT DOCUMENTS

| | | | |
|---|---|---|---|
| 61-276387 | 12/1986 | Japan | 372/103 |
| 63-192285 | 8/1988 | Japan | |
| 64-69083 | 3/1989 | Japan | |
| WO88/02536 | 4/1988 | WIPO | 372/103 |

*Primary Examiner*—John D. Lee
*Assistant Examiner*—Hemang Sanghavi
*Attorney, Agent, or Firm*—Burns, Doane, Swecker & Mathis

[57] ABSTRACT

A laser apparatus includes an unstable resonator having a total reflection mirror and a take-out mirror, and further includes shading means for shading a disturbed phase portion of a laser beam so as to derive exclusively a light having a uniform phase by shading the disturbed phase portion of the beam emitted from the resonator or the beam in the resonator.

16 Claims, 7 Drawing Sheets

LASER APPARATUS INCLUDES AN UNSTABLE RESONATOR AND A SHADING MEANS

BACKGROUND OF THE INVENTION

1. Field of the Invention

The present invention relates to a laser apparatus including a laser resonator containing a laser active medium whose vertical and lateral dimensions are different from one another in a section perpendicular to a laser optical axis.

2. Description of the Prior Art

FIG. 1 is a schematic plan view showing a conventional laser resonator disclosed in, for example, Japanese Patent Application Laid-Open No. 63-192285. FIG. 2 is a schematic sectional view showing a section perpendicular to a laser optical axis of a laser apparatus employing the laser resonator. In FIG. 2, reference numeral 20 is a 72 MHz high-frequency generator, 21 is a power matching circuit, 22 is a high-frequency cable, 23 is an insulating feedthrough, 71 and 72 are electrodes, and 73 and 74 are surfaces of the electrodes, which are polished to provide optically reflective surfaces. Further, reference numeral 75 means a discharge gap, 76 and 77 are spacers to insulate the electrodes 71, 72, and 78 is a U-shaped base. The assembly including the electrodes 71, 72 and the spacers 76, 77 is mounted on the base 78. The U-shaped base 78 is enclosed by a cover 79, and a ceramic insulator 80 is disposed between the cover 79 and the electrode 71. As shown in FIG. 1, the laser resonator includes a total reflection mirror 3 having a concave surface, and a take-out mirror 4 having a convex surface which is notched to form a notch 41a, and such a laser resonator is classified into a positive branch unstable laser resonator.

In the conventional laser apparatus constructed as set forth above, high frequency generated by the high-frequency generator 20 is applied between the electrodes 71 and 72 through the power matching circuit 21 and the high-frequency cable 22. The discharge gap 75 disposed between the electrodes 71 and 72 is filled with laser gas 1 (see FIG. 1), and the laser gas 1 is discharged and excited by the high frequency which is applied between the electrodes 71 and 72. The laser gas 1 is disposed between the total reflection mirror 3 and the take-out mirror 4 as shown in FIG. 1. Since the laser resonator including the total reflection mirror 3 and the take-out mirror 4 contains the excited laser gas 1, that is, a laser active medium 1, laser oscillation can be performed. At this time, in a plane shown in FIG. 1, the laser resonator is provided with the total reflection mirror 3 and the take-out mirror 4 to form a so-called unstable resonator. Further, the laser resonator can serve as a so-called waveguide type resonator in a direction perpendicular to the plane. In other words, the resonator is an unstable/waveguide type hybrid resonator. A laser beam is emitted externally to the laser resonator from the notch 41a of the take-out mirror 4. Assuming that the distance between the electrodes 71 and 72 is 2 mm, and distances between edges of the electrodes 71, 72 and an edge of the take-out mirror 4 including the convex surface mirror are 2 mm. It is possible to derive a square beam having each side of about 2 mm from the notch 41a. It has been considered that the beam becomes a substantially circular beam if the beam is separated from the laser resonator by a predetermined distance.

Since the conventional laser apparatus is constructed as set forth above, optical energy having weak intensity is generated due to diffraction of light even on the outside of a ray 521 of a geometrically and optically outermost portion. The phase of the light largely fluctuates so that the light may cause disturbance of the laser beam external to the laser resonator when the light is emitted and propagated out of the laser resonator. Hence, the laser beam derived from the laser resonator is a laser beam which is not symmetrical with respect to an unstable direction. Consequently, there is a problem in that the laser beam has a deformed circular form rather than a completely circular form at a position apart from the laser resonator by the predetermined distance.

SUMMARY OF THE INVENTION

In view of the foregoing, it is an object of the present invention to provide a laser apparatus which can provide a completely circular laser beam by providing a laser beam which is symmetrical with respect to an unstable direction.

It is another object of the present invention to provide a laser apparatus which enables simplification in a structure thereof.

According to the first aspect of the present invention, for achieving the above-mentioned objects, there is provided a laser apparatus including shading means for removing light generated due to diffraction of light on the outside of a parallel laser light in an unstable resonator in an unstable direction of an unstable/waveguide type hybrid laser resonator.

Consequently, in the laser apparatus according to the first aspect of the present invention, the shading means is provided to remove the light generated due to the diffraction of light on the outside of the parallel laser light in the unstable resonator. Therefore, it is possible to shade a disturbed phase portion of a laser light emitted from the resonator or a laser light in the resonator, and thereby deriving exclusively a laser light having a uniform phase.

According to the second aspect of the present invention, there is provided a laser apparatus in which a shading plate is provided on the side of a notch of a take-out mirror, and is used to remove light generated on the outside of a parallel laser light in an unstable resonator due to diffraction of light.

Consequently, in the laser apparatus according to the second aspect of the present invention, the shading plate is provided on the side of the notch of the take-out mirror, and is used to remove the light generated on the outside of the parallel laser light in the unstable resonator due to the diffraction of light. Therefore, it is possible to mount the shading plate by using a mounting member of the take-out mirror.

According to the third aspect of the present invention, there is provided a laser apparatus in which a shading plate is provided on the side opposed to a notch of a take-out mirror, and is used to remove light generated on the outside of a parallel laser light in an unstable resonator due to diffraction of light.

Consequently, in the laser apparatus according to the third aspect of the present invention, the shading plate is provided on the side opposed to the notch of the take-out mirror, and is used to remove the light generated on the outside the parallel laser light in the unstable resonator due to the diffraction of light. Therefore, it is possible to mount the shading plate by using a mounting member of the take-out mirror.

According to the fourth aspect of the present invention, there is provided a laser apparatus in which shading means is movably mounted.

Consequently, in the laser apparatus according to the fourth aspect of the present invention, the shading means is movably mounted so that adjustment of the shading means can be facilitated.

According to the fifth aspect of the present invention, there is provided a laser apparatus in which non-reflective treatment is applied to at least any one of the laser light take-out side of a total reflection mirror, the side thereof opposed to the laser light take-out side, and the side opposed to the laser light take-out side of a take-out mirror.

Consequently, in the laser apparatus according to the fifth aspect of the present invention, the non-reflective treatment is applied to at least any one of the laser light take-out side of the total reflection mirror, the side thereof opposed to the laser light take-out side, and the side opposed to the laser light take-out side of the take-out mirror. Therefore, it is possible to remove light generated on the outside of a parallel laser light in an unstable resonator due to diffraction of light without a new member as shading means.

According to the sixth aspect of the present invention, there is provided a laser apparatus in which one notch is provided in a part of a total reflection mirror on the side of the other notch of the take-out mirror so as to remove light generated on the outside of a parallel laser light in an unstable resonator due to diffraction of light.

Consequently, in the laser apparatus according to the sixth aspect of the present invention, the one notch is provided in a part of the total reflection mirror on the side of the other notch of the take-out mirror so as to remove the light generated on the outside of the parallel laser light in the unstable resonator due to the diffraction of light. Therefore, it is unnecessary to provide a new member as shading means.

According to the seventh aspect of the present invention, there is provided a laser apparatus in which one notch is provided in a take-out mirror on the side opposed to the other notch of the take-out mirror so as to remove light generated on the outside of a parallel laser light in an unstable resonator due to diffraction of light.

Consequently, in the laser apparatus according to the seventh aspect of the present invention, one notch is provided in the take-out mirror on the side opposed to the other notch of the take-out mirror so as to remove the light generated on the outside of the parallel laser light in the unstable resonator due to the diffraction of light. Therefore, it is unnecessary to provide a new member as shading means.

According to the eighth aspect of the present invention, there is provided a laser apparatus in which a holding member is disposed at a predetermined position to form a laser excitation/discharge space so as to remove light generated on the outside of a parallel laser light in an unstable resonator due to diffraction of light.

Consequently, in the laser apparatus according to the eighth aspect of the present invention, the holding member is disposed at the predetermined position to form the laser excitation/discharge space, and is used to remove the light generated on the outside of the parallel laser light in the unstable resonator due to the diffraction of light. Therefore, it is unnecessary to provide a new member as shading means.

According to the ninth aspect of the present invention, there is provided a laser apparatus in which a discharge space forming member is inclined with respect to a parallel laser light in order to form a laser excitation/discharge space, and the inclined discharge space forming member is used to remove light generated on the outside of the parallel laser light in an unstable resonator due to diffraction of light.

Consequently, in the laser apparatus according to the ninth aspect of the present invention, the discharge space forming member is inclined with respect to the parallel laser light in order to form the laser excitation/discharge space, and the inclined discharge space forming member is used to remove the light generated on the outside of the parallel laser light in the unstable resonator due to the diffraction of light. Therefore, it is unnecessary to provide a new member as shading means.

According to the tenth aspect of the present invention, there is provided a laser apparatus in which a take-out mirror includes a laser light transmitting member, a reflecting film mounted on the laser light transmitting member so as to bypass a laser light take-out portion of the laser light transmitting member, and a shading film provided at a predetermined position of the laser light transmitting member, and the shading film is used to remove light generated on the outside of a parallel laser light in an unstable resonator due to diffraction of light.

Consequently, in the laser apparatus according to the tenth aspect of the present invention, the take-out mirror includes the laser light transmitting member, the reflecting film mounted on the laser light transmitting member so as to bypass the laser light take-out portion of the laser light transmitting member, and the shading film provided at the predetermined position of the laser light transmitting member, and the shading film is used to remove the light generated on the Outside of the parallel laser light in the unstable resonator due to the diffraction of light. Therefore, it is unnecessary to provide a new member as shading means.

According to the eleventh aspect of the present invention, there is provided a laser apparatus in which a shading film is provided at a predetermined position of a laser light take-out window provided for a take-out mirror, and is used to remove light generated on the outside of a parallel laser light in an unstable resonator due to diffraction of light.

Consequently, in the laser apparatus according to the eleventh aspect of the present invention, the shading film is provided at the predetermined position of the laser light take-out window provided for the take-out mirror, and is used to remove the light generated on the outside of the parallel laser light in the unstable resonator due to the diffraction of light. Therefore, it is unnecessary to provide a new member as shading means.

According to the twelfth aspect of the present invention, there is provided a laser apparatus including cooling means for cooling shading means for removing light generated on the outside of a parallel laser light in an unstable resonator due to diffraction of light.

Consequently, the laser apparatus according to the twelfth aspect of the present invention includes the cooling means for cooling the shading means for removing the light generated on the outside of the parallel laser light in the unstable resonator due to the diffraction of light. Therefore, it is possible to cool the shading means by the cooling means, thereby preventing the shading means from being heated by the laser light.

The above and further objects and novel features of the invention will more fully appear from the following detailed description when the same is read in connection with the accompanying drawings. It is to be expressly understood, however, that the drawings are for purpose of illustration only and are not intended as a definition of the limits of the invention.

DETAILED DESCRIPTION OF THE PREFERRED EMBODIMENTS

Preferred embodiments of the invention will now be described in detail referring to the accompanying drawings.

Embodiment 1

Figure 3:
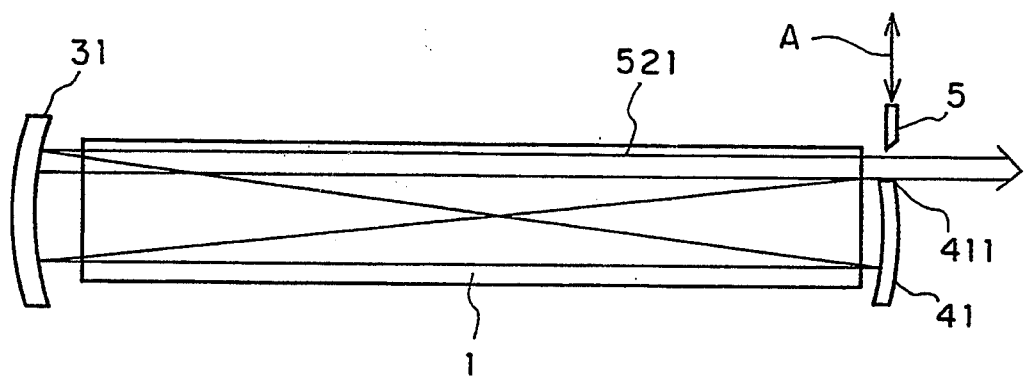
FIG. 3 is a sectional view of a laser apparatus, illustrating the embodiment 1 of the present invention.

FIG. 3 is a sectional view showing the embodiment 1 of the present invention. In FIG. 3, reference numeral 31 is a concave total reflection mirror, and 41 is a concave take-out mirror whose upper end is notched to form a notch 411, and the take-out mirror 41 includes a total reflection mirror. The total reflection mirror 31 and the take-out mirror 41 are provided to form a negative branch unstable resonator. Further, reference numeral 5 means a shading plate (shading means) which is disposed above the notch 411 of the take-out mirror 41, and is spaced therefrom by a predetermined distance. In FIG. 3, 1 means a laser active medium(laser medium), and the laser active medium 1 is disposed between the total reflection mirror 31 and the take-out mirror 41.

A description will now be given of the operation. In the laser apparatus according to the embodiment 1 constructed as set forth above, an induced emission light can be generated by performing laser oscillation of the laser active medium 1. The generated induced emission light is reflected and enlarged by the take-out mirror 41, and the enlarged induced emission light is reflected by the total reflection mirror 31, resulting in a collimated light. The collimated light is propagated in a direction of the take-out mirror 41, and the light is partially emitted externally to the laser resonator through the notch 411 of the take-out mirror 41.

In this case, the light reflected by an end of the notch 411 is reflected by the total reflection mirror 31, and the light reflected by the total reflection mirror 31 is reflected by the take-out mirror 41 again. Further, the light again reflected by the take-out mirror 41 is reflected by the total reflection mirror 31 once again. As a result, the reflected light is defined as a geometrically and optically outermost portion of light in the laser resonator, and a ray of the outermost portion is identified by reference numeral 521.

On the other hand, optical energy having weak intensity is generated due to diffraction of light of the laser apparatus shown in FIG. 3 even on the outside of the ray 521 of the geometrically and optically outermost portion. The phase of a ray having the weak optical energy largely fluctuates so that the light may cause disturbance of the laser beam external to the laser resonator when the light is emitted and propagated out of the laser resonator. Therefore, it is necessary to prevent the ray on the outside of the ray 521 of the outermost portion in the laser resonator from being emitted externally to the laser resonator in order to provide a desired laser beam. The shading plate 5 is provided for this purpose, and is attached to any desired position by, for example, using a mirror holder (not shown) of the take-out mirror 41.

Figure 4:
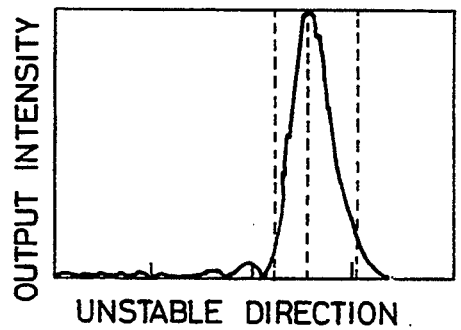
FIG. 4(a) is a graph diagram showing a calculated value of an intensity distribution of a radial beam in case no shading plate is used.
FIG. 4(b) is a graph diagram showing the calculated value of the intensity distribution of the radial beam in case the shading plate is used.
Figure 4:
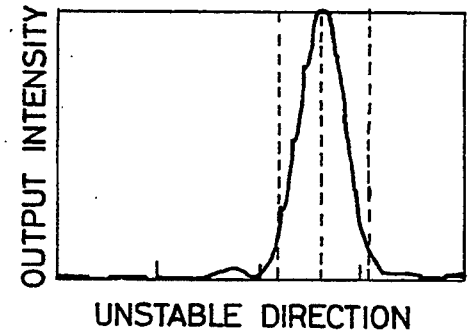

FIG. 4(a) is a graph diagram showing a computer simulation value of an intensity distribution of a laser beam emitted out of the laser resonator in a case where the shading plate 5 is not used. FIG. 4(b) is a graph diagram showing the computer simulation value of the intensity distribution of the laser beam emitted out of the laser resonator in the case where the shading plate 5 is used. As is obvious from FIGS. 4(a), (b), a peak of a beam intensity is positioned at a laser beam center to provide a symmetrical intensity distribution in the case where the shading plate 5 is used while the peak of the beam intensity is deviated from the laser beam center to provide an asymmetrical intensity distribution in the case where the shading plate 5 is not used.

Figure 5:
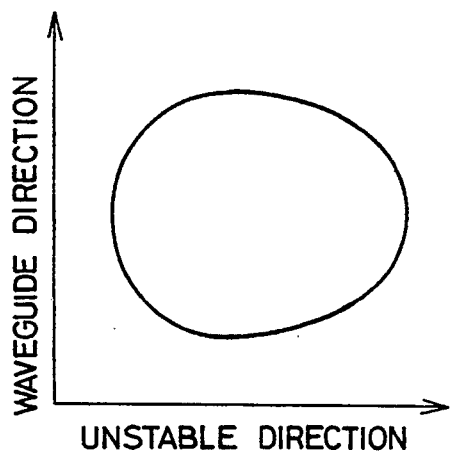
FIG. 5(a) is a diagram showing a shape of the radial beam in case no shading plate is used.
FIG. 5(b) is a diagram showing the shape of the radial beam in case the shading plate is used.
Figure 5:
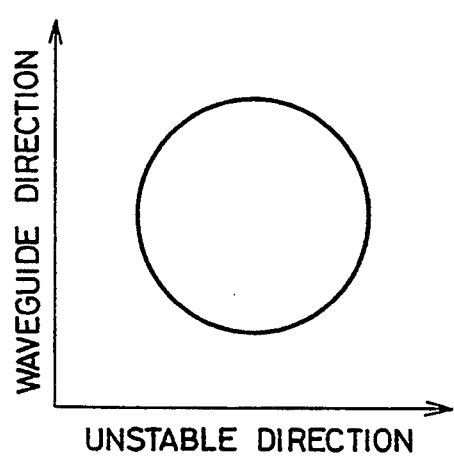

In actuality, it was possible to obtain the same experimental results as the computer simulation values shown in FIGS. 4(a) and (b) when the laser apparatus was operated in a condition where the shading plate 5 is used, and in a condition where the shading plate 5 is not used. That is, the laser beam had a deformed circular shape (see FIG. 5(a)) in case the laser beam was emitted without the shading plate 5 while the laser beam had a circular shape (see FIG. 5(b)) in case the laser beam was emitted with the shading plate 5. It was thereby proved that the laser beam emitted from the laser resonator can have the asymmetrical shape without the shading plate 5, and the symmetrical shape with the shading plate 5.

Further, it is possible to improve stability of a beam mode as well as stability of the output irrespective of variation of tilt angles of the total reflection mirror 31 and the take-out mirror 41 by providing the shading plate 5.

The embodiment 1 has been described with reference to a case where the shading plate 5 is fixedly mounted. However, it must be noted that the present invention should not be limited to this embodiment, the shading plate 5 may be disposed movably in a vertical direction (i.e., a direction shown by the arrow A) as shown in FIG. 3. In this case, since a position of the shading plate 5 can be adjusted, it is possible to provide a more symmetrical laser beam.

Embodiment 2

Figure 1:
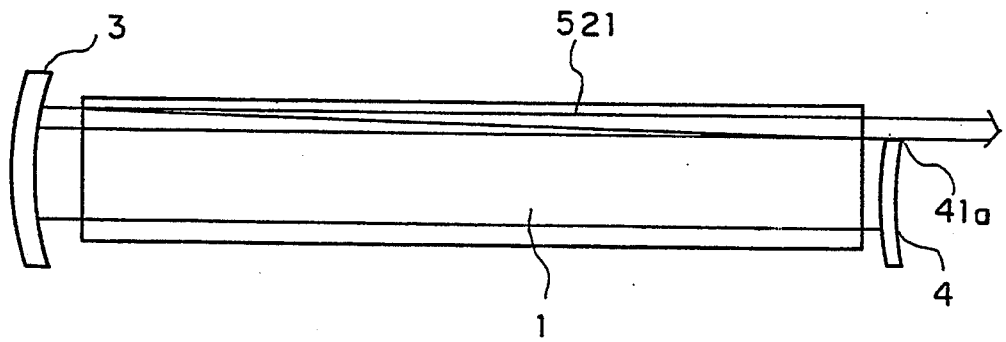
FIG. 1 is a plan view showing a conventional laser apparatus.
Figure 2:
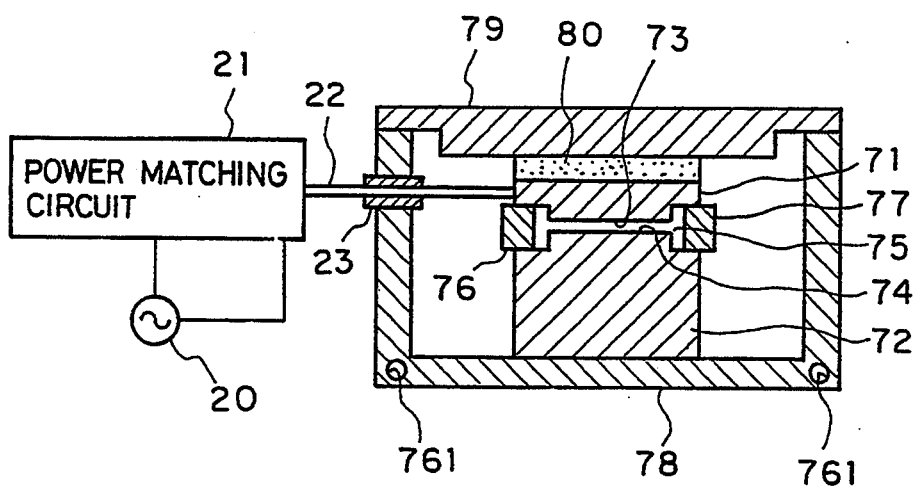
FIG. 2 is a sectional view of the laser apparatus shown in FIG. 1 in a direction perpendicular to a laser optical axis.
Figure 6:
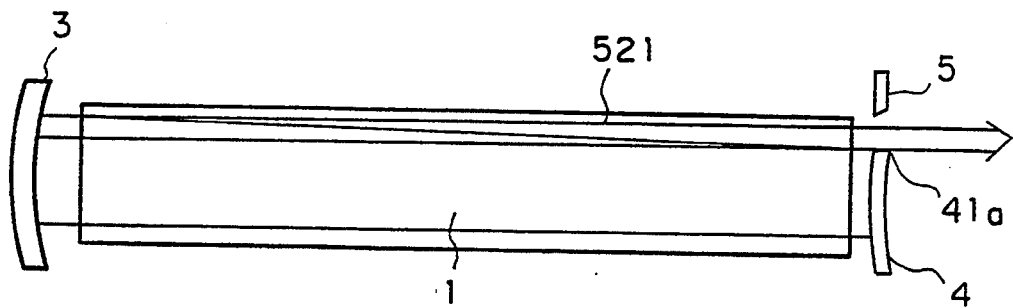
FIG. 6 is a plan view of the laser apparatus, illustrating the embodiment 2 of the present invention.

The embodiment 1 has been described with reference to a case where the shading plate 5 is attached to the negative branch unstable laser resonator. However, it must be noted that the present invention should not be limited to this embodiment. It is possible to provide the same effect by attaching the shading plate 5 to a positive branch unstable laser resonator including a concave total reflection mirror 3 and a convex take-out mirror 4 as shown in FIG. 6. The positive branch unstable laser resonator has been described with reference to the conventional laser apparatus in FIG. 1. Therefore, the same reference numerals are used for component parts identical with those of FIG. 1, and descriptions thereof are omitted. Further, the same reference numerals are used for components of FIG. 6 identical with those in the embodiment 1 shown in FIG. 3, and descriptions thereof are omitted.

Embodiment 3

Figure 7:
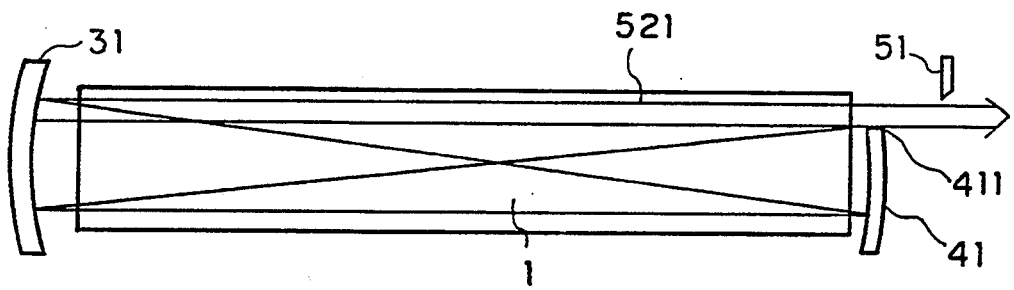
FIG. 7 is a plan view of the laser apparatus, illustrating the embodiment 3 of the present invention.

In the embodiment 1 shown in FIG. 3 and the embodiment 2 shown in FIG. 6, the shading plate 5 is positioned at substantially the same position as that of the take-out mirror 41 or 4. However, a shading plate (shading means) 51 may be positioned on the outside of the laser resonator as shown in FIG. 7 according to the embodiment 3. Even in this case, it is possible to use the shading plate 5 so as to shade the light whose phase largely fluctuates, traveling on the outside of the ray 521 of the outermost portion in the laser resonator. Therefore, it is possible to provide a symmetrical laser beam.

Embodiment 4

Figure 8:
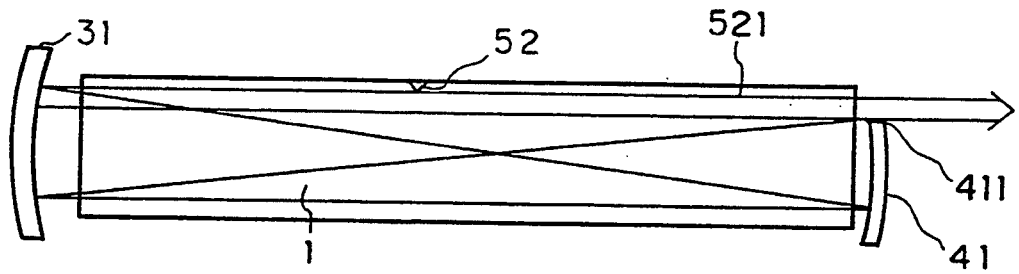
FIG. 8 is a plan view of the laser apparatus, illustrating the embodiment 4 of the present invention.

Alternatively, shading means 52 may be mounted in the laser resonator as shown in FIG. 8 according to the embodiment 4. In this case, the shading means 52 can be mounted by using a discharge tube wall of a gas laser apparatus.

Embodiment 5

Figure 9:
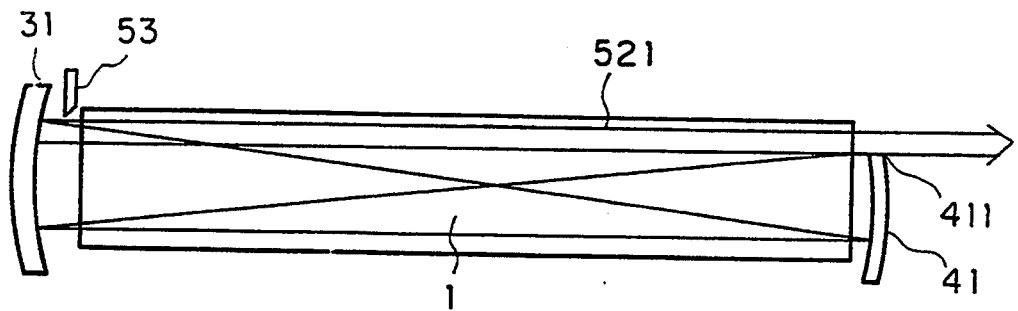
FIG. 9 is a plan view of the laser apparatus, illustrating the embodiment 5 of the present invention.

In addition, as shown in FIG. 9 according to the embodiment 5, a shading plate 53 may be mounted on the side of the total reflection mirror 31 so as to collimate a laser beam.

Embodiment 6

Figure 10:
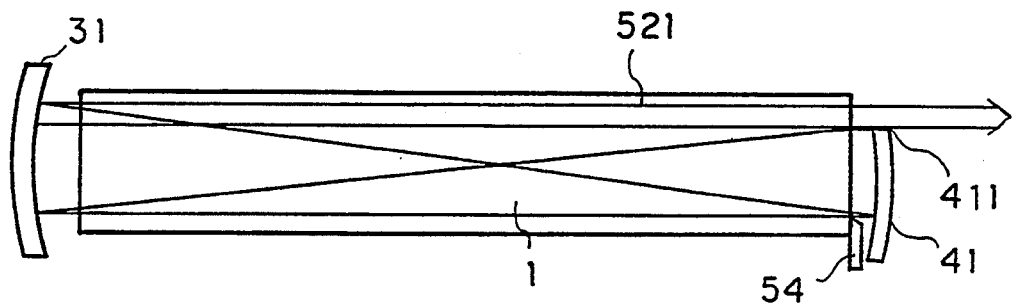
FIG. 10 is a plan view of the laser apparatus, illustrating the embodiment 6 of the present invention.

If a negative branch unstable laser resonator is employed, a shading plate 54 may be mounted on the side opposed to the laser beam take-outside or output of the take-out mirror 41 (i.e., the side of the notch 411) as shown in FIG. 10 according to the embodiment 6. In this case, it is possible to shade the light of the outermost portion in the resonator, whose phase largely fluctuates, and provide a symmetrical laser beam.

Embodiment 7

Figure 11:
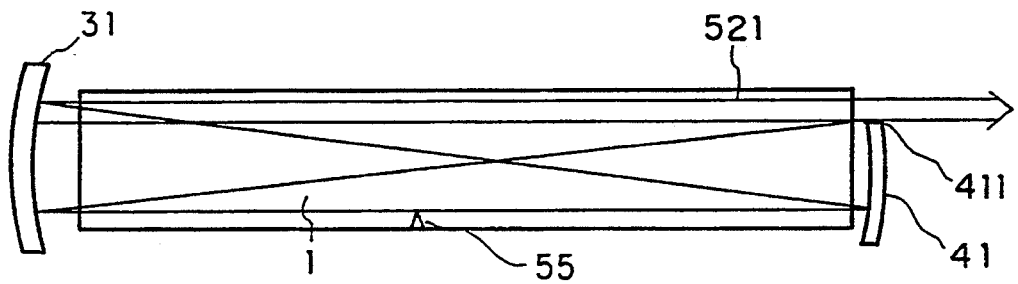
FIG. 11 is a plan view of the laser apparatus, illustrating the embodiment 7 of the present invention.

As shown in FIG. 11 according to the embodiment 7, shading means 55 may be mounted on the side opposed to the beam take-out or output side in the laser resonator. In this case, it is possible to shade the light whose phase largely fluctuates, traveling on the outside of the ray 521 of the outermost portion in the laser resonator as in the case of FIG. 10. Therefore, it is possible to provide a symmetrical laser beam.

Embodiment 8

Figure 12:
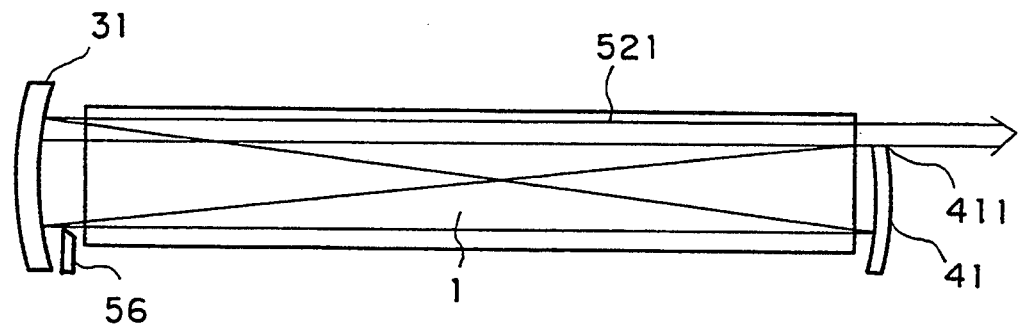
FIG. 12 is a plan view of the laser apparatus, illustrating the embodiment 8 of the present invention.

As shown in FIG. 12 according to the embodiment 8, a shading plate 56 may be mounted on the side of the total reflection mirror 31 and on the side opposed to the laser beam take-out side so as to collimate the laser beam.

Embodiment 9

Figure 13:
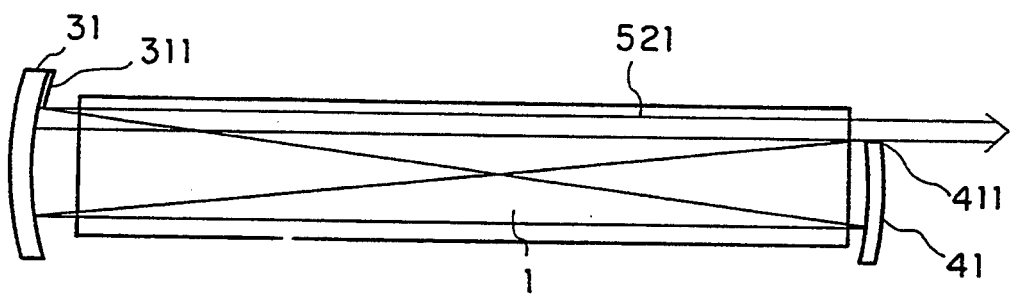
FIG. 13 is a plan view of the laser apparatus, illustrating the embodiment 9 of the present invention.

In the embodiments 1 to 8, the shading plate is provided separately from the total reflection mirror or the take-out mirror. However, as shown in FIG. 13 according to the embodiment 9, non-reflective treatment 311 may be applied to the total reflection mirror 31 so as to shade the light whose phase fluctuates, traveling on the outside of the ray 521 of the outermost portion in the laser resonator. In this case, since it is not necessary to provide shading parts in particular, the laser apparatus can be further simplified.

Embodiment 10

Figure 14:
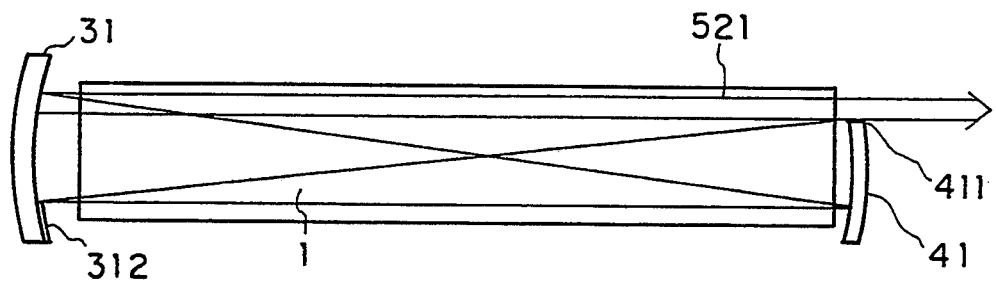
FIG. 14 is a plan view Of the laser apparatus, illustrating the embodiment 10 of the present invention.

If a negative branch unstable laser resonator is employed, as shown in FIG. 14 according to the embodiment 10, non-reflective treatment 312 may be applied to the side opposed to the laser beam take-out output side of the total reflection mirror 31 so as to shade the light whose phase fluctuates, traveling on the outside of the ray 521.

Embodiment 11

Figure 15:
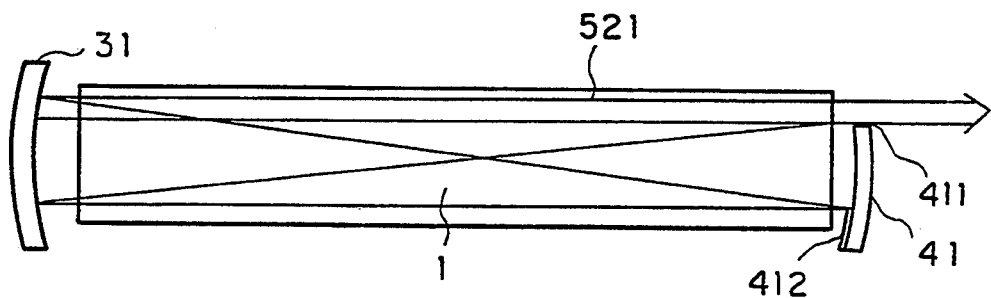
FIG. 15 is a plan view of the laser apparatus, illustrating the embodiment 11 of the present invention.

Alternatively, as shown in FIG. 15 according to the embodiment 11, non-reflective treatment 412 may be applied to the side opposed to the laser beam take-out or output side of the take-out mirror 41 (i.e., the side of the notch 411) so as to shade the light whose phase fluctuates, traveling on the outside of the ray 521.

Embodiment 12

Figure 16:
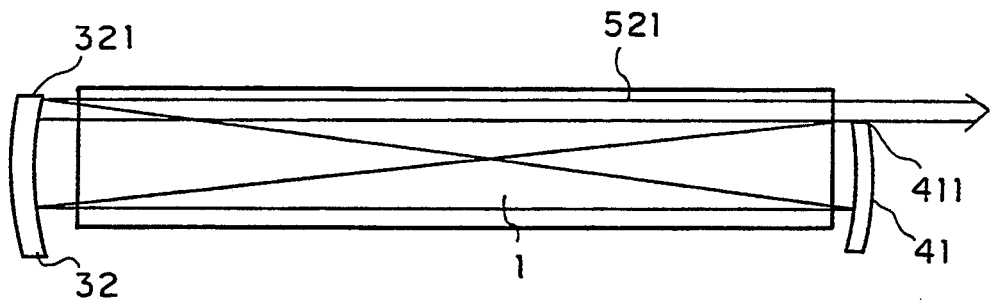
FIG. 16 is a plan view of the laser apparatus, illustrating the embodiment 12 of the present invention.

In the embodiments 9 to 11, the non-reflective treatment is applied to a reflecting surface of the total reflection mirror 31 or the take-out mirror 41. However, it must be noted that the present invention should not be limited to these embodiments, as shown in FIG. 16 according to the embodiment 12, a notch 321 may be provided in a total reflection mirror 32 to eliminate a reflecting light so as to substantially shade the light whose phase fluctuates, traveling on the outside of the ray 521. In this case, since it is not necessary to apply the non-reflective treatment for shading, the laser apparatus can be simplified.

Embodiment 13

Figure 17:
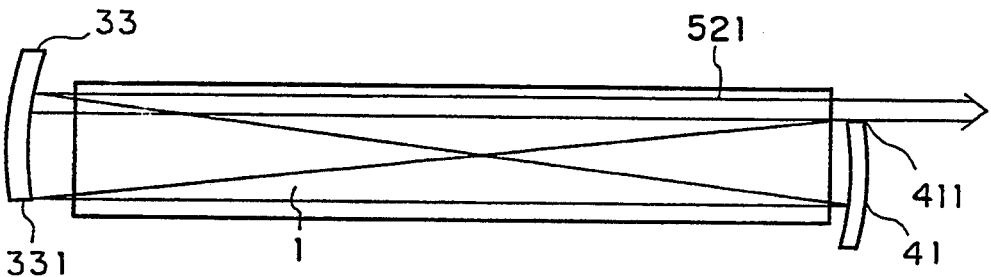
FIG. 17 is a plan view of the laser apparatus, illustrating the embodiment 13of the present invention.

Alternatively, as shown in FIG. 17 according to the embodiment 13, a notch 331 may be provided in the total reflection mirror 33 on the side opposed to the laser beam take-out side thereof if a negative branch unstable resonator is employed.

Embodiment 14

Figure 18:
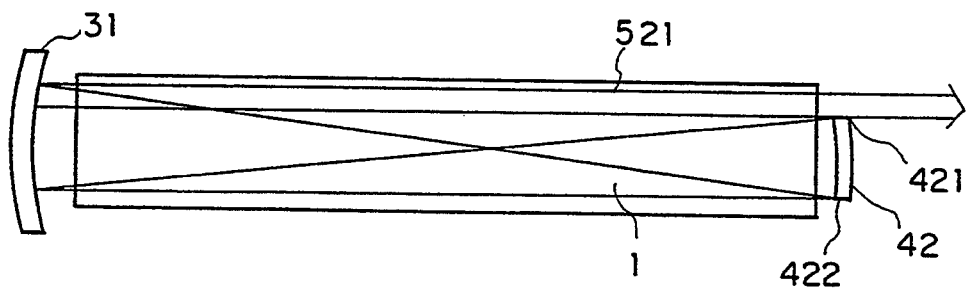
FIG. 18 is a plan view of the laser apparatus, illustrating the embodiment 14 of the present invention.

Alternatively, as shown in FIG. 18 according to the embodiment 14, a notch 422 may be provided in the take-out mirror 42 on the side opposed to the laser beam take-out side thereof if a negative branch unstable resonator is employed.

Embodiment 15

Figure 19:
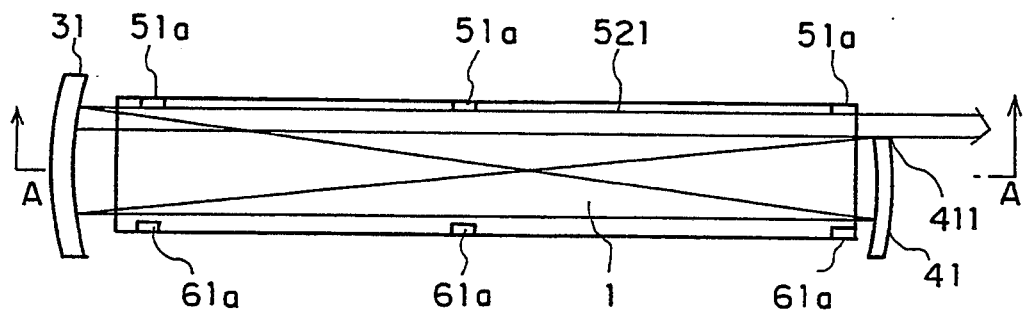
FIG. 19 is a plan view of the laser apparatus, illustrating the embodiment 15 of the present invention.
Figure 20:
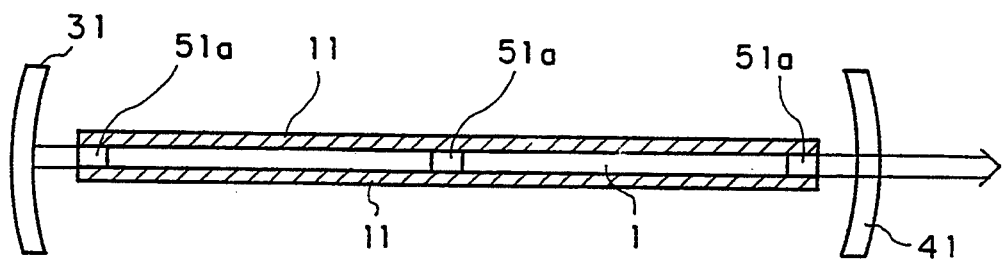
FIG. 20 is a sectional view taken along line A—A of FIG. 19.

FIG. 19 illustrates the embodiment 15, and FIG. 20 is a sectional view taken along line A—A of FIG. 19. In FIGS. 19 and 20, reference numeral 11 means a member to form excitation/discharge space into which the laser active medium 1 is filled, and 51a and 61a mean members to hold the pair of members 11 at a predetermined distance. Thus, the members 51a, 61a to hold a gap in the discharge space may be at least partially used to shade the light whose phase largely fluctuates, traveling on the outside of the ray 521.

Embodiment 16

Figure 21:
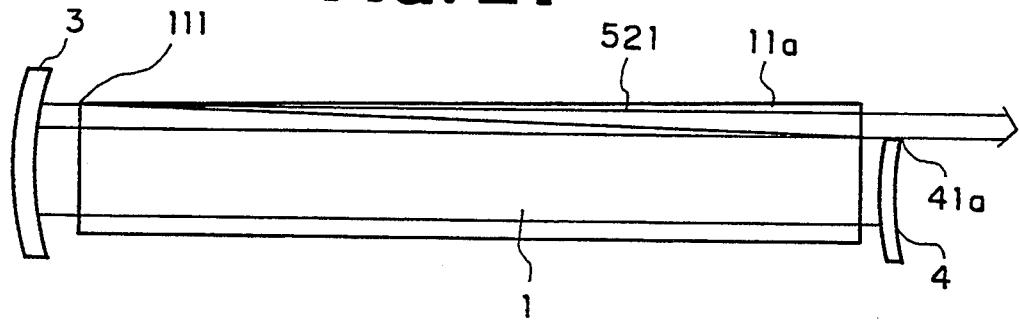
FIG. 21 is a plan view of the laser apparatus, illustrating the embodiment 16 of the present invention.

In the prior art laser apparatus excited by microwave discharge, which is disclosed in, for example, Japanese Patent Application Laid-Open No. 64-69083, a discharge space is defined by a surface forming a longer side of a section thereof and a surface forming a shorter side of the section. In this case, as shown in FIG. 21 according to the embodiment 16, a surface 11a forming the shorter side may be inclined with respect to an optical axis. Thereby, it is possible to shade the light whose phase largely fluctuates, traveling on the outside of the ray 521 with an edge 111 of the surface 11a forming the shorter side on the side of a total reflection mirror 3.

Embodiment 17

Figure 22:
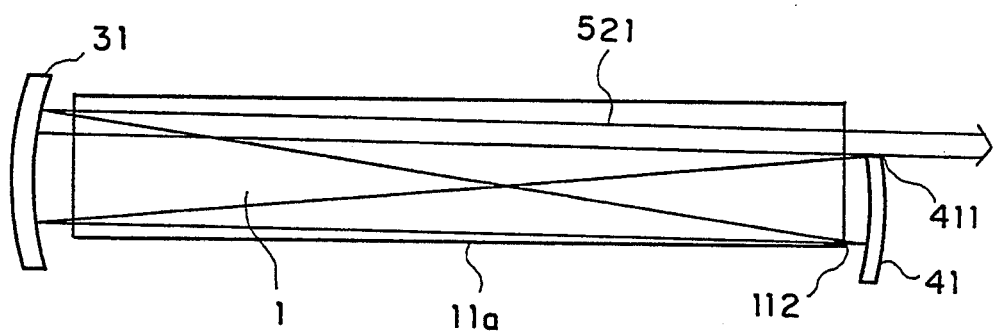
FIG. 22 is a plan view of the laser apparatus, illustrating the embodiment 17 of the present invention.

If the negative branch unstable resonator is employed, a surface 11a forming a shorter side may be inclined with respect to an optical axis as shown in FIG. 22 according to the embodiment 17. It is thereby possible to shade the light whose phase largely fluctuates, traveling on the outside of the ray 521, on the side of the take-out mirror 41 of the surface 11a forming the shorter side with an edge 112 positioned on the side opposed to the laser beam take-out side.

Embodiment 18

Figure 23:
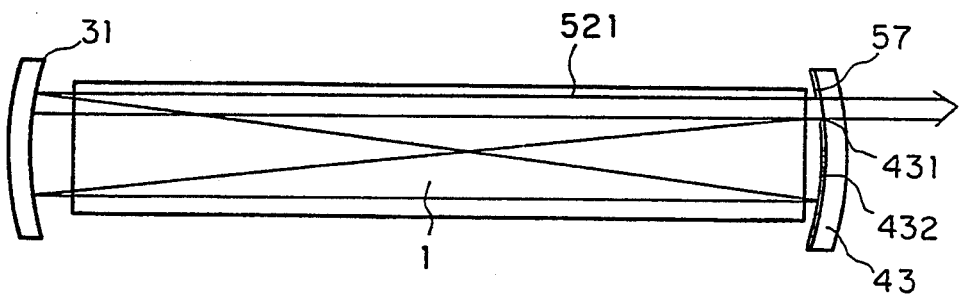
FIG. 23 is a plan view of the laser apparatus, illustrating the embodiment 18 of the present invention.

FIG. 23 illustrates the embodiment 18, and a reflecting film 432 is provided for a laser transmission material to form a take-out mirror 43 of FIG. 23. A portion 431 (i.e., a laser transmission portion 431) is formed at an upper end of the take-out mirror 43 so as not to have the reflecting film 432, and a shading film 57 is provided above the portion 431. Thus, the shading film 57 may be used to shade the light whose phase largely fluctuates, traveling on the outside of a beam.

Embodiment 19

Figure 24:
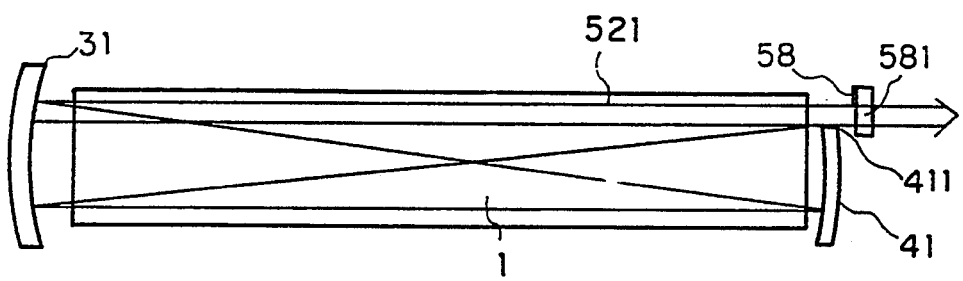
FIG. 24 is a plan view of the laser apparatus, illustrating the embodiment 19 of the present invention.

In a gas laser, a beam take-out window 581 is required for a beam take-out portion as shown in FIG. 24 according to the embodiment 19. In this case, a shading film 581 may be provided for the beam take-out window 58 so as to shade the light whose phase largely fluctuates, traveling on the outside of a laser beam.

Embodiment 20

Figure 25:
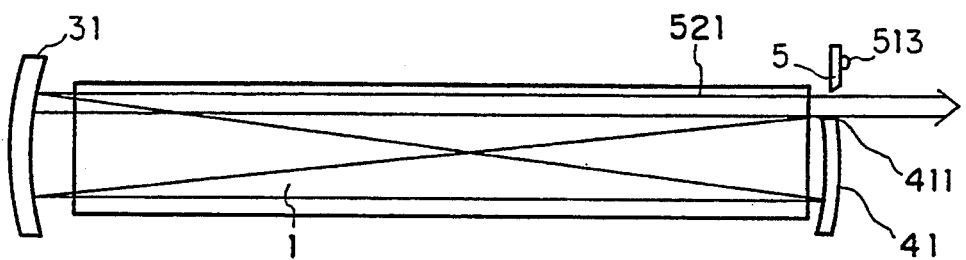
FIG. 25 is a plan view of the laser apparatus, illustrating the embodiment 20 of the present invention.

The shading plate 5 may be possibly heated due to an increased laser output of the laser apparatus. However, if a water cooling pipe (cooling means) 513 is provided for the shading plate 5 so as to cool the shading plate 5 as shown in FIG. 25 according to the embodiment 20, it is possible to avoid drawbacks of, for example, deformation of the shading plate 5 due to overheating. Needless to say, the shading plate 5 can be also cooled by air-cooling means which feeds cooling wind.

The embodiments 1 to 20 have been described with reference to a case where a laser beam has the same diameter in a direction of the unstable resonator as that in a direction perpendicular thereto, that is, the laser beam has a circular section. However, it must be noted that the present invention should not be limited to the laser apparatus in which beam diameters in both directions are mutually identical, and may be applied to a laser apparatus in which beam diameters in both directions are different from one another. According to the present invention, it is possible to provide a symmetrical laser beam in a direction of the unstable resonator even if the beam diameters in both directions are different from one another. Consequently, the laser beam becomes symmetrical in both directions so that the laser beam has an elliptical shape. The elliptical laser beam can be shaped into a circular laser beam by using a mirror or a lens.

Further, the above embodiments have been described with reference to the gas laser apparatus. However, the present invention should not be limited to the gas laser, and may be applied to a laser resonator which is operated in one-direction as an unstable resonator in a laser apparatus having a laser active medium whose section is flat, such as slab solid laser apparatus. In this case, it is possible to provide the same effect as that in the embodiments.

As set forth above, according to the first aspect of the present invention, the laser apparatus includes shading means for removing the light generated due to diffraction of light on the outside, of a parallel laser light in the unstable resonator in an unstable direction of an unstable/waveguide type hybrid laser resonator. Therefore, it is possible to shade a disturbed phase portion of a laser light emitted from the resonator or a laser light in the resonator, and thereby deriving exclusively a laser light having a uniform phase. Hence, it is possible to provide a laser light which is symmetrical-with respect to the direction of the unstable resonator. Further, there is provided the shading means so that it is possible to output a stable laser light irrespective of variation of tilt angles of the total reflection mirror and the take-out mirror.

In the laser apparatus according to the second aspect of the present invention, the shading plate is provided on the side of the notch of the take-out mirror so as to remove the light generated on the outside of the parallel laser light in the unstable resonator due to the diffraction of light. Therefore, it is possible to mount the shading plate by using a mounting member of the take-out mirror, resulting in simplification of the laser apparatus.

In the laser apparatus according to the third aspect of the present invention, the shading plate is provided on the side opposed to the notch of the take-out mirror. Therefore, it is possible to mount the shading plate by using a mounting member of the take-out mirror, resulting in simplification of the laser apparatus.

In the laser apparatus according to the fourth aspect of the present invention, the shading means is movably mounted. Therefore, it is possible to easily adjust the shading means so as to provide a laser light having excellent symmetry property.

In the laser apparatus according to the fifth aspect of the present invention, the non-reflective treatment is applied to at least any one of the laser light take-out side of the total reflection mirror, the side thereof opposed to the laser light take-out side, and the side opposed to the laser light take-out side of the take-out mirror. Therefore, it is not necessary to provide a new member as shading means, resulting in simplification of the laser apparatus.

In the laser apparatus according to the sixth aspect of the present invention, the notch is provided in a part of the total reflection mirror on the side of the notch of the take-out mirror so as to remove the light generated on the outside of the parallel laser light in the unstable resonator due to the diffraction of light. Therefore, it is unnecessary to provide a new member as shading means, resulting in simplification of the laser apparatus.

In the laser apparatus according to the seventh aspect of the present invention, one notch is provided in the take-out mirror on the side opposed to the other notch of the take-out mirror so as to remove the light generated on the outside of the parallel laser light in the unstable resonator due to the diffraction of light. Therefore, it is unnecessary to provide a new member as shading means, resulting in simplification of the laser apparatus.

In the laser apparatus according to the eighth aspect of the present invention, the holding member is disposed at the predetermined position to form the laser excitation/discharge space so as to remove the light generated on the outside of the parallel laser light in the unstable resonator due to the diffraction of light. Therefore, it is unnecessary to provide a new member as shading means, resulting in simplification of the laser apparatus.

In the laser apparatus according to the ninth aspect of the present invention, the discharge space forming member is inclined with respect to the parallel laser light in order to form the laser excitation/discharge space, and the inclined discharge space forming member is used to remove the light generated on the outside of the parallel laser light in the unstable resonator due to the diffraction of light. Therefore, it is unnecessary to provide a new member as shading means, resulting in simplification of the laser apparatus.

In the laser apparatus according to the tenth aspect of the present invention, the take-out mirror includes the laser light transmitting member, the reflecting film mounted on the laser light transmitting member so as to bypass the laser light take-out portion of the laser light transmitting member, and the shading film provided at the predetermined position of the laser light transmitting member, and the shading film is used to remove the light generated on the outside of the parallel laser light in the unstable resonator due to diffraction of light. Therefore, it is unnecessary to provide a new member as shading means, resulting in simplification of the laser apparatus.

In the laser apparatus according to the eleventh aspect of the present invention, the shading film is provided at the predetermined position of the laser light take-out window which is provided for the take-out mirror, and the shading film is used to remove light generated on the outside of the parallel laser light in the unstable resonator due to diffraction of light. Therefore, it is unnecessary to provide a new member as shading means, resulting in simplification of the laser apparatus.

According to the twelfth aspect of the present invention, the laser apparatus includes the cooling means for cooling the shading means for removing the light generated on the outside of the parallel laser light in the unstable resonator due to the diffraction of light. Therefore, it is possible to cool the shading means by the cooling means, thereby preventing the shading means from being heated by the laser light and from being deformed. It is thereby possible to reliably remove the light generated on the outside of the parallel laser light in the unstable resonator due to the diffraction of light, resulting in more symmetrical laser light.

While preferred embodiments of the invention have been described using specific terms, such description is for illustrative purposes only, and it is to be understood that changes and variations may be made without departing from the spirit or scope of the following claims.

What is claimed is:

1. A laser apparatus comprising:
    a laser medium excited so as to emit an induced emission light;
    an unstable resonator including a total reflection mirror opposed to one end of said laser medium to reflect said induced emission light so as to use as a parallel laser light, and a take-out mirror opposed to the other end of said laser medium to have a notch to partially derive said parallel laser light reflected by said total reflection mirror; and
    shading means for removing light generated on the outside of said parallel laser light in said unstable resonator due to diffraction of light.

2. A laser apparatus according to claim 1, wherein said shading means is movably provided.

3. A laser apparatus according to claim 1, wherein said shading means is provided by applying non-reflective coating to at least any one of a laser light output side of said total reflection mirror, a side thereof opposed to the laser light output side, and a side opposed to the laser light output side of said take-out mirror.

4. A laser apparatus comprising:
    a laser medium excited so as to emit an induced emission light;
    an unstable resonator including a total reflection mirror opposed to one end of said laser medium to reflect said induced emission light so as to use as a parallel laser light, and a take-out mirror opposed to the other end of said laser medium to have a notch to partially derive said parallel laser light reflected by said total reflection mirror; and shading means mounted on a side of said notch of said take-out mirror, for removing light generated on the outside of said parallel laser light in said unstable resonator due to diffraction of light.

5. A laser apparatus according to claim 4, wherein said shading means is movably provided.

6. A laser apparatus according to claim 4, wherein said shading means is provided by applying non-reflective coating to at least any one of a laser light output side of said total reflection mirror, a side thereof opposed to the laser light output side, and a side opposed to the laser light output side of said take-out mirror.

7. A laser apparatus comprising:

a laser medium excited so as to emit an induced emission light;

a negative branch unstable resonator including a concave total reflection mirror opposed to one end of said laser medium to reflect said induced emission light so as to use as a parallel laser light, and a concave take-out mirror opposed to the other end of said laser medium to have a notch to partially derive said parallel laser light reflected by said total reflection mirror; and shading means mounted on a side opposed to said notch of said take-out mirror, for removing light generated on the outside of said parallel laser light in said unstable resonator due to diffraction of light.

8. A laser apparatus according to claim 7, wherein said shading means is movably provided.

9. A laser apparatus according to claim 7, wherein said shading means is provided by applying non-reflective coating to at least any one of a laser light output side of said total reflection mirror, a side thereof opposed to the laser light output side, and a side opposed to the laser light output side of said take-out mirror.

10. A laser apparatus comprising:

a laser medium excited so as to emit an induced emission light; and an unstable resonator including a total reflection mirror opposed to one end of said laser medium to reflect said induced emission light so as to use as a parallel laser light, and a take-out mirror opposed to the other end of said laser medium to have one notch to partially derive said parallel laser light reflected by said total reflection mirror, wherein another notch is provided in a part of said total reflection mirror on a side of said one notch of said take-out mirror so as to remove light generated on the outside of said parallel laser light in said unstable resonator due to diffraction of light.

11. A laser apparatus comprising:

a laser medium excited so as to emit an induced emission light;

a negative branch unstable resonator including a concave total reflection mirror opposed to one end of said laser medium to reflect said induced emission light so as to use as a parallel laser light, and a concave take-out mirror opposed to the other end of said laser medium to have one notch to partially derive said parallel laser light reflected by said total reflection mirror, wherein another notch is provided in said take-out mirror on a side opposed to said one notch of said take-out mirror so as to remove light generated on the outside of said parallel laser light in said unstable resonator due to diffraction of light.

12. A laser apparatus comprising:

a laser medium filled into a laser discharge space, and being excited so as to emit an induced emission light;

an unstable resonator including a total reflection mirror opposed to one end of said laser medium to reflect said induced emission light so as to use as a parallel laser light, and a take-out mirror opposed to the other end of said laser medium to have a notch to partially derive said parallel laser light reflected by said total reflection mirror, wherein a holding member forming said laser discharge space is disposed at a predetermined position so as to remove light generated on the outside of said parallel laser light in said unstable resonator due to diffraction of light.

13. A laser apparatus comprising:

a laser medium filled into a laser discharge space, and being excited so as to emit an induced emission light;

an unstable resonator including a total reflection mirror opposed to one end of said laser medium to reflect said induced emission light so as to use as a parallel laser light, and a take-out mirror opposed to the other end of said laser medium to have a notch to partially derive said parallel laser light reflected by said total reflection mirror, wherein a discharge space forming member is disposed to be inclined with respect to said parallel laser light so as to form said laser discharge space, and said discharge space forming member being used to remove light generated on the outside of said parallel laser light in said unstable resonator due to diffraction of light.

14. A laser apparatus comprising:

a laser medium filled into a laser discharge space, and being excited so as to emit an induced emission light;

an unstable resonator including a total reflection mirror opposed to one end of said laser medium to reflect said induced emission light so as to use as a parallel laser light, and a take-out mirror opposed to the other end of said laser medium to have a notch to partially derive said parallel laser light reflected by said total reflection mirror, wherein said take-out mirror includes a laser light transmitting member, a reflecting film mounted on said laser light transmitting member so as to bypass a laser light take-out portion of said laser light transmitting member, and a shading film provided at a predetermined position of said laser light transmitting member, and said shading film being used to remove light generated on the outside of said parallel laser light in said unstable resonator due to diffraction of light.

15. A laser apparatus comprising:

a laser medium filled into a laser discharge space, and being excited so as to emit an induced emission light;

an unstable resonator including a total reflection mirror opposed to one end of said laser medium to reflect said induced emission light so as to use as a parallel laser light, and a take-out mirror opposed to the other end of said laser medium to have a notch to partially derive said parallel laser light reflected by said total reflection mirror, wherein a shading film is provided at a predetermined position of a laser light take-out window provided for said take-out mirror, and said shading film being used to remove light generated on the outside of said parallel laser light in said unstable resonator due to diffraction of light.

16. A laser apparatus comprising:
a laser medium excited so as to emit an induced emission light;
an unstable resonator including a total reflection mirror opposed to one end of said laser medium to reflect said induced emission light so as to use as a parallel laser light, and a take-out mirror opposed to the other end of said laser medium to have a notch to partially derive said parallel laser light reflected by said total reflection mirror;
shading means for removing light generated on the outside of said parallel laser light in said unstable resonator due to diffraction of light; and
cooling means for cooling said shading means.

* * * * *